United States Patent
Uwai et al.

[11] Patent Number: 6,020,279
[45] Date of Patent: *Feb. 1, 2000

[54] PROCESS FOR PRODUCING A SOLID CATALYST COMPONENT FOR OLEFIN POLYMERIZATION AND A PROCESS FOR PRODUCING AN OLEFIN POLYMER

[75] Inventors: Toshihiro Uwai; Masami Tachibana; Jun Saito, all of Chibaken, Japan

[73] Assignee: Chisso Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,304

[22] Filed: Sep. 6, 1995

[30] Foreign Application Priority Data

Sep. 6, 1994 [JP] Japan .................................. 6-238556
Sep. 6, 1994 [JP] Japan .................................. 6-238557

[51] Int. Cl.⁷ ........................................................ C08F 4/64
[52] U.S. Cl. .................................. 502/9; 502/8; 502/111; 502/125; 526/124.2; 526/901
[58] Field of Search ...................................... 502/8, 9, 111

[56] References Cited

U.S. PATENT DOCUMENTS

| 5,100,849 | 3/1992 | Miya et al. ................................. 502/8 |
| 5,234,879 | 8/1993 | Garoff et al. ............................ 502/111 |

FOREIGN PATENT DOCUMENTS

| 0 491 566 A2 | 6/1992 | European Pat. Off. . |
| 49-65999 | 6/1974 | Japan . |
| 52-38590 | 3/1977 | Japan . |
| 55-135102 | 10/1980 | Japan . |
| 55-135103 | 10/1980 | Japan . |
| 56-67311 | 6/1981 | Japan . |
| 57-198709 | 12/1982 | Japan . |
| 58-45206 | 3/1983 | Japan . |
| 59-131606 | 7/1984 | Japan . |
| 63-289005 | 11/1988 | Japan . |
| 63-503550 | 12/1988 | Japan . |
| 3-119003 | 5/1991 | Japan . |
| 4-296305 | 10/1992 | Japan . |
| WO 87/07620 | 12/1987 | WIPO . |
| WO 93/11166 | 6/1993 | WIPO . |

*Primary Examiner*—David W. Wu
*Attorney, Agent, or Firm*—McDermott, Will & Emery

[57] ABSTRACT

A solid catalyst component for olefin polymerization superior in shatter resistance and narrowness of particle size distribution, is provided, which component is prepared by spraying a mixture of Mg compound with an alcohol in a molten state, in a column; cooling the inside of the column; to obtain a component (B); partly removing the alcohol from (B), to obtain a solid component (C); contacting a halogen-containing Ti compound and an electron donor with (C); to obtain (D); contacting (D) with a halogen-containing Ti compound;

in the above process, specifying the composition formulas of (A), (B) and (C); specifying the X-ray diffraction spector of (C) in comparison of that of (B); and contacting (C) with a halogen-containing Ti compound and an electron donor using an aliphatic hydrocarbon of a specified b.p., in a specified temperature.

1 Claim, 5 Drawing Sheets

PROCESS FOR PRODUCING A SOLID CATALYST COMPONENT FOR OLEFIN POLYMERIZATION AND A PROCESS FOR PRODUCING AN OLEFIN POLYMER

DETAILED DESCRIPTION OF THE INVENTION

1. Field of the Invention

This invention relates to a process for producing a solid catalyst component for olefin polymerization and a process for producing an olefin polymer. More particularly, it relates to a process for producing a solid catalyst component for polymerization of an olefin of 3 or more carbon atoms which may contain silicon or copolymerization of one or more kinds of the olefin with ethylene, and suitable to gas phase polymerization, which component has a spherical form of a relatively large particle diameter and also has a superior shatter resistance at the time of polymerization; and a process for producing an olefin polymer using the above solid catalyst component.

2. Prior Art

As to the solid catalyst component for olefin polymerization, the so-called supported type solid catalyst supported on magnesium compound has been known in recent years, and a number of techniques exhibiting a superior performance in the polymerization activity have been disclosed. In the case of such a supported type solid catalyst component, it is preferred to control the shape of the solid catalyst component particles, and certain processes therefor have been known. On the other hand, in recent years, as olefin polymerization process, there have been employed gas phase polymerization processes which have a higher safety and save resources and energy as compared with conventional slurry polymerization using a polymerization solvent.

However, many of the above supported type solid catalyst components are insufficient as a solid catalyst component which is suitable to gas phase polymerization of olefins, has a spherical shape having a relatively large particle diameter, has a superior shatter resistance at the time of polymerization, and can afford a highly stereoregular olefin polymer. Particularly when the shatter resistance is insufficient, fine powder in the resulting olefin polymer particles increases, and various problems are raised such as a problem that fine powder polymer adheres onto the wall of the polymerization vessel, a problem that fine powder polymer is accompanied by unreacted olefin, flows out of the polymerization vessel, is deposited onto the inside of the equipments such as pipings, cooler, etc. in the circulating system to the polymerization vessel for unreacted olefin and as a result, clogs the system, and an operational problem that powder fluidity characteristic deteriorates to thereby make difficult the discharge of olefin polymer from the polymerization vessel.

As one of the prior art, there has been disclosed a process wherein a melt of a carrier component is emulsified in a suitable oil to form spherical, molten particles, followed by adding the particles into a hydrocarbon medium, to rapidly solidify them, and the resulting carrier is used (Japanese patent application laid-open Nos. Sho 55-135102, Sho 55-135103 and Sho 56-67311).

According to such a process, a solid catalyst component having a shape improved to a certain extent is obtained, but it is difficult to obtain a product of a spherical shape having a large particle diameter for the catalyst component for olefin gas phase polymerization; hence such a process has been insufficient.

As a different process, a process has been disclosed wherein a solution of a magnesium compound in water or an alcohol is sprayed into a heated nitrogen gas current, followed by vaporizing water or the alcohol from the resulting droplets by heated nitrogen gas, and the resulting carrier is used (Japanese patent application Nos. Sho 49-65999, Sho 52-38590, Sho 58-45206, Sho 57-198709, Sho 59-131606 and Sho 63-289005).

Further, Japanese patent application laid-open No. Sho 63-503550 discloses a process wherein a mixture of magnesium chloride, an alcohol and an electron donor, in a molten state, is sprayed into a chamber cooled by an inert liquid fluid and the resulting carrier obtained without vaporization of solvent is used.

The carrier according to the above spray process has a relatively large particle diameter, but there have been raised a problem that when treatment with titanium halide is successively carried out, the carrier is broken to form fine particles, or a problem that the solid catalyst component for olefin polymerization obtained by using the carrier is insufficient in the aspects of sphering, shatter resistance at the time of polymerization and polymerization activity.

Further, Japanese patent application laid-open No. Hei 4-296305 discloses a process wherein a carrer of $MgCl_2 \cdot 3EtOH$ obtained according to spray method is used, and $TiCl_4$ is reacted therewith at a relatively low temperature, followed by adding diisobutyl phthalate, and successively reacting the mixture in nonane solvent under a high temperature condition to obtain a solid catalyst component for olefin polymerization.

This process, too, exhibits an effect to a certain extent for improving the stereoregularity of olefin polymer, but there has been raised a problem accompanying the above-mentioned, conventional spray process.

On the other hand, the present applicant has previously disclosed in Japanese patent application laid-open No. Hei 3-119003 (hereinafter referred to as "previous invention"), a process wherein a mixture of a magnesium compound with an alcohol is sprayed in a molten state, to obtain a spherical solid component without substantial vaporization of the alcohol, followed by partly removing the alcohol from the solid component to obtain a spherical carrier, thereafter contacting the carrier with a halogen-containing Ti compound and an electron donor, to obtain a final solid catalyst component for olefin polymerization.

According to the process, a solid catalyst component for olefin polymerization, which is spherical and has a large particle diameter, is obtained, but when it is used for olefin gas phase polymerization, a further improvement has been desired in the aspect of shatter resistance at the time of polymerization.

Problem to be Solved by the Invention

As described above, solid catalyst component for olefin polymerization, obtained according to process of the prior art has been insufficient for a solid catalyst component for gas phase polymerization which is desired to exhibit properties of a good shape, a relatively large particle diameter and yet a superior shatter resistance at the time of polymerization, and being capable of affording a highly stereospecific olefin polymer with a high polymerization activity.

The present inventors have made extensive research into a process for producing a catalyst component for olefin polymerization having solved the above described problems and suitable to a gas phase polymerization of an olefin of 3 or more carbon atoms which may contain silicon or to a gas phase copolymerization of one or more kinds of the olefin with ethylene.

As a result, we have improved the above-described previous invention and have found that the above problems of the prior art can be solved according to the following process:

a molten mixture of a magnesium compound with an alcohol, expressed by a specified composition formula is sprayed into a cooled spray column to obtain a solid component without any substantial vaporization of the alcohol, followed by removing a specified quantity of the alcohol from the solid component under a specified condition, to obtain a carrier having a specified X-ray diffraction spector, contacting a halogen-containing titanium compound and an electron donor with the above carrier in the presence of a solvent having a specified boiling point and under a specified temperature condition, further contacting a titanium halide, and using the resulting final solids as a solid catalyst component for olefin polymerization.

The present invention has been made based upon the above knowledge.

As apparent from the above description, the object of the present invention is to provide a process for producing a solid catalyst component for olefin polymerization, which is suitable to gas phase polymerization of olefin, has a good shape and a comparatively large particle diameter, has a superior shatter resistance at the time of polymerization, and can afford a highly stereoregular olefin polymer under a high polymerization activity; and a process for producing an olefin polymer by (co)polymerizing olefin in the presence of a catalyst having combined the above solid catalyst component, an organoaluminum compound and if necessary, an electron donor.

SUMMARY OF THE INVENTION

The present invention has the following constitutions (1) to (8):

(1) In a process wherein a mixture (A) of a magnesium compound with an alcohol is sprayed in a molten state into a spray column, and at that time, the inside of the spray column is cooled down to a temperature at which a solid component (B) is obtained without any substantial vaporization of the alcohol in the mixture (A), to obtain the solid component (B), followed by partly removing the alcohol from the solid component (B), to obtain a solid component (C), thereafter contacting a halogen-containing titanium compound and an electron donor (E1) with the solid component (C), to obtain a solid component (D), and further contacting a halogen-containing titanium compound with the solid component (D), to obtain a solid component (F) as an ultimate solid catalyst component for olefin polymerization, a process for producing a solid catalyst component for olefin polymerization (F) which is characterized in that ① the composition Formula of the mixture (A) and the solid component (B) is $MgCl_2 \cdot mROH$ wherein R represents an alkyl group of 1 to 10C and m=3.0 to 6.0;

② the composition formula of the solid component (C) is expressed by $MgCl_2 \cdot nROH$ wherein R represents an alkyl group of 1 to 10C and n=0.4 to 2.8;

③ in the X-ray diffraction spector of the solid component (C), a novel peak does not occur at a diffraction angle 2θ=7 to 8° as compared with the X-ray diffraction spector of the solid component (B), or even if it occurs, the intensity of the novel peak is 2.0 times or less the intensity of the highest peak present in the diffraction angle 2θ=8.5 to 9° of the X-ray diffraction spectrum of the solid component (C); and ④ the contact of the halogen-containing titanium compound and the electron donor with the solid component (C) is carried out at 110° to 135° C. using an aliphatic hydrocarbon solvent (S) having a boiling point of 90° to 180° C.

(2) A process according to item (1), wherein the aliphatic hydrocarbon solvent (S) having a boiling point of 90° to 180° C. is an isoparaffin mixture.

(3) A process according to item (1), wherein the average particular diameter of the solid component (F) is 10 to 300 μm.

(4) A process according to item (1), wherein the solid catalyst component for olefin polymerization is used for polymerizing an olefin of 3 or more carbon atoms which may contain silicon or used for copolymerizing one or more kinds of the olefin with ethylene.

(5) A process for producing an olefin (co)polymer, characterized by (co)polymerizing one or more kinds of olefins in the presence of a catalyst consisting of a solid catalyst component a) and b) an organoaluminum compound (AL) and if necessary, c) an electron donor (E2), the solid catalyst component a) being prepared as follows;

a mixture (A) of a magnesium compound with an alcohol is sprayed in a molten state into a spray column, and at that time, the inside of the spray column is cooled down to a temperature at which a solid component (B) is obtained without any substantial vaporization of the alcohol in the mixture (A), to obtain the solid component (B), followed by partly removing the alcohol from the solid component (B), to obtain a solid component (C), thereafter contacting a halogen-containing titanium compound and an electron donor (El) with the solid component (C), to obtain a solid component (D), and further contacting a halogen-containing titanium compound with the solid component (D), and the solid catalyst component a) being obtained by satisfying the following preparation conditions ① to ④:

① the composition formula of the mixture (A) and the solid component (B) is $MgCl_2 \cdot mROH$ wherein R represents an alkyl group of 1 to 10C and m=3.0 to 6.0;

② the composition formula of the solid component (C) is expressed by $MgCl_2 \cdot nROH$ wherein R represents an alkyl group of 1 to 10C and n=0.4 to 2.8;

③ in the X-ray diffraction spector of the solid component (C), a novel peak does not occur at a diffraction angle 2θ=7 to 8° as compared with the X-ray diffraction spector of the solid component (B), or even if it occurs, the intensity of the novel peak is 2.0 times or less the intensity of the highest peak present in the diffraction angle 26=8.5 to 9° of the X-ray diffraction spector of the solid component (C); and ④ the contact of the halogen-containing titanium compound and the electron donor with the solid component (C) is carried out at 110° to 135° C. using an aliphatic hydrocarbon solvent (S) having a boiling point of 90° to 180° C.

(6) A process according to item (5), wherein said aliphatic hydrocarbon solvent (S) having a boiling point of 90° to 180° C. is an isoparaffin mixture.

(7) A process according to item (5), wherein the average particular diameter of said solid catalyst component a) is 10 to 300 μm.

(8) A process according to item (5), wherein said olefin (co)polymer is an olefin (co)polymer of 3 or more carbon atoms which may contain silicon, or a copolymer of one or more kinds of olefins of 3 or more carbon atoms which may contain silicon, with ethylene.

BRIEF DESCRIPTION OF THE DRAWINGS

1: raw material-feeding pipe
2: raw material-feeding pipe
3: pressurized nitrogen gas-feeding pipe
4: melting tank
5: heating jacket
6: transporting pipe for molten mixture (A)
7: heated nitrogen gas-feeding pipe
8: two-fluids nozzle
9: spray column
10: cooling jacket
11: inert hydrocarbon solvent (S1)
12: piping for obtaining solid component (B)
13: gas-discharging pipe
14: cyclone
15: pipe for discharging solid component (B) accompanied by gas
16: gas-discharging pipe

DETAILED DESCRIPTION OF THE INVENTION

The constitution and effectiveness of the present invention will be described in more detail.

The magnesium compound used for producing the solid catalyst component (F) in the present invention is anhydrous magnesium chloride and it may contain a trace quantity of water to an extent of quantity contained in commercially available product. Further, the used alcohol is an alcohol expressed by the formula of ROH (wherein R represents an alkyl group of 1 to 10C).

Concrete examples are methanol, ethanol, 1-propanol, 2-propanol, 2-methyl-2-propanol, 1-butanol, 2-butanol, 2-methyl-1-butanol, 2-methyl-2-butanol, 3-methyl-1-butanol, 1-pentanol, 2-pentanol, 3-pentanol, 1-hexanol, 2-hexanol, 3-hexanol, 2-ethylhexanol, 1-octanol, 2-octanol, 1-nonanol, 1-decanol, etc. Among these, ethanol is most preferred. Further, it is also possible to use these alcohols in admixture of two or more kinds.

In the production process of the solid catalyst component (F), firstly a mixture (A) of magnesium chloride with an alcohol is brought into a molten state. As to the ratio by weight of magnesium chloride to the alcohol, the both is mixed so as to give m=3.0 to 6.0 in the composition formula of $MgCl_2 \cdot mROH$ (wherein R represents an alkyl group of 1 to 10C). The range of m is preferably 3.0 to 5.8, more preferably 3.0 to 5.5. If m is less than 3.0, there are raised problems that the shape of the resulting solid catalyst component for olefin polymerization becomes inferior and the activity of olefin polymerization lowers. If m exceeds 6.0, the shatter resistance of the solid catalyst component for olefin polymerization becomes inferior.

When the mixture (A) of magnesium chloride with an alcohol having the above composition is heated, a molten state is obtained. The heating temperature has no particular limitation as far as it is a temperature or higher at which the molten state is obtained, but it is preferably 80° to 200° C., more preferably 100° to 180° C., particularly preferably 110° to 160° C. If the heating temperature is too low, there occur problems that the shape of the solid catalyst component for olefin polymerization becomes inferior and the olefin polymerization activity lowers. Whereas, if the heating temperature is too high, the shatter resistance of the resulting solid catalyst component for olefin polymerization becomes inferior.

The thus obtained mixture of magnesium compound with alcohol in molten state is fed into a spray nozzle fixed onto a spray column, by means of a pump or a pressurized, heated inert gas, and sprayed into a cooled spray column through the nozzle.

As the inert gas, inert gas such as nitrogen helium, argon, etc. is used, and nitrogen is most preferably used. Further, the spray nozzle has a function of dispersing the mixture of magnesium compound with alcohol in molten state in the spray column, and a two-fluids nozzle as a type of feeding the inert gas into the spray column is preferably used. As to this spray, when the size of the nozzle, the flow quantity of the inert gas or the spray flow quantity of the mixture of the magnesium compound with the alcohol in molten state is chosen, it is possible to adjust the size of the formed solid component (B) or the distribution of particle size.

The spray in the process of the present invention is carried out in a cooled spray column, and the cooling is carried out usually by introducing a cooled inert gas or a cooled inert liquid fluid, for example, liquid nitrogen, etc. into the spray column. Further, at the time of spray, it is also possible to promote the cooling by spraying a cooled inert hydrocarbon solvent (S1), for example, hexane, through another nozzle. It is necessary to carry out the cooling at a temperature at which the solid component (B) is obtained without any substantial vaporization of alcohol, that is, up to a temperature to an extent to which the composition formula of the mixture (A) of magnesium chloride with alcohol and the solid component (B) is unchanged.

Thus, the temperature in the spray column is −70° to 10°, preferably −50° to 0° C., particularly preferably −40° to −5° C. If the cooling temperature is too high, alcohol vaporizes, and the particle-shape of the resulting solid component (B) is inferior and yet, heterogeneous; hence it is impossible to achieve the object of the present invention. Further, too low cooling temperature is not practical.

After the spray according to the above process, the resulting solid component (B) is collected at the bottom part of the spray column or in an inert hydrocarbon solvent (S1) introduced into the bottom part of the spray column. As the inert hydrocarbon solvent (S1) used for spray in the case of necessity, aliphatic hydrocarbons such as pentane, hexane, heptane, octane, decane, etc., halogenated aliphatic hydrocarbons such as 1,2-dichloroethane, 1,1,2-trichloroethane, etc., aromatic hydrocarbons such as benzene, toluene, xylene, etc., and halogenated hydrocarbons such as chlorobenzene, o-dichlorobenzene, etc. are used, and aliphatic hydrocarbons are preferably used, and among them, hexane is particularly preferable.

The composition of the solid component (B) is the same as that of the mixture (A) of magnesium chloride with alcohol and that of the mixture (A) in molten state before spray, and its average particle diameter is about 10 to 300 μm and its shape is spherical.

Figure 1:
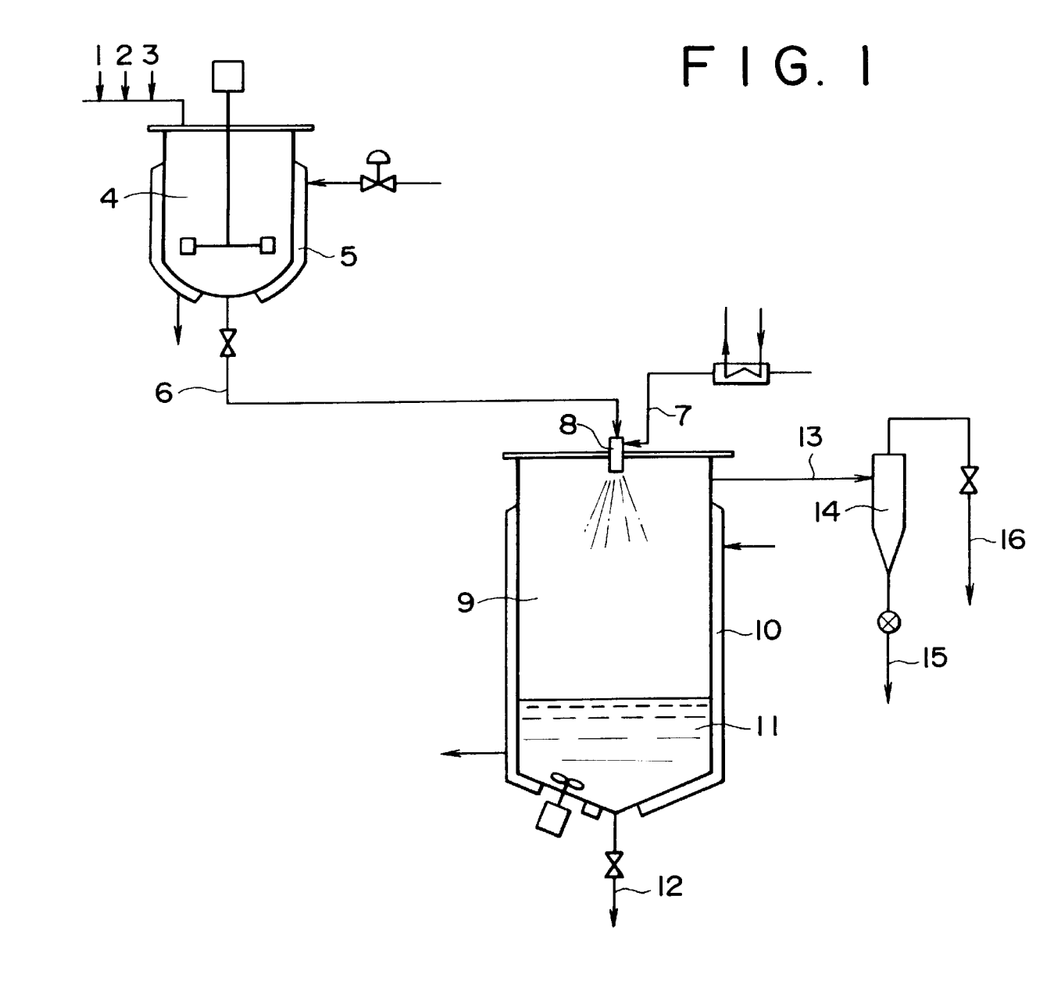
FIG. 1 shows a flow sheet of a production equipment of the solid component (B), for illustrating the process of the present invention. The meanings of the symbols in FIG. 1 are as follows.

In order to explain the present invention, an embodiment of the production apparatus employed for producing the above solid product (B) of the present invention is shown in FIG. 1.

A magnesium compound and alcohol are introduced into a melting tank 4 provided with a heating jacket 5 through pipings 1 and 2, and the mixture (A) of the magnesium compound with the alcohol is heated by the heating jacket 5 to form a molten state. The mixture (A) in molten state is passed through a heat-insulating pipe 6 by pressurized nitrogen introduced through a piping 3, and sprayed into a spray column 9 cooled by a cooling jacket 10, together with heated nitrogen introduced through a piping 7. Further, an inert hydrocarbon solvent (S1) 11 has been introduced in advance in the bottom part of the spray column and cooled. The molten mixture (A) is cooled and solidified in the spray column 9, and the resulting solid component (B) is collected in the inert hydrocarbon solvent (S1) 11 at the lower part of the spray column.

The thus obtained solid component (B) is withdrawn from a piping 12 together with the inert hydrocarbon solvent (S1), and if necessary, the inert hydrocarbon solvent (S1) is separated, and thereafter the component is sent to the next step. On the other hand, the gas component and the solid component (B) entrained by the gas are introduced into a cyclone 14 via a piping 13. The entrained solid component (B) is discharged via a piping 15 and the gas component is discharged from a piping 16.

In the present invention, successively to the above step, the alcohol is partly removed from the resulting solid component (B) to obtain a solid component (C).

As to the process of partly removing the alcohol, various known processes can be employed. For example, ① a process of heating the solid component, ② a process of keeping the solid component (B) under reduced pressure or ③ a process of passing an inert gas at atmospheric temperature or heated, through the solid component (B), are mentioned. Further, it is also possible to employ these processes of partly removing the alcohol in combination. As a process capable of easily achieving the object of the present invention, a process having combined ① with ② is preferred.

The alcohol is partly removed from the solid component (B) according to the above process, and it is necessary to choose the conditions of the process of partly removing the alcohol portion, so that in the composition of the solid component (C) obtained after the process of partly removing the alcohol, expressed by the formula $MgCl_2 \cdot nROH$ (wherein R represents an alkyl group of 1 to 10C), n may fall within a range of 0.4 to 2.8. Preferable range of n is 0.8 to 2.5 and particularly preferable range is 1.0 to 2.2.

If n is less than 0.4, the olefin polymerization activity of the resulting solid catalyst component for olefin polymerization lowers. Whereas, if n exceeds 2.8, the solid component (C) is broken in the subsequent contact process of titanium halide therewith, and the resulting solid catalyst component for olefin polymerization contains amorphous, fine powder particles, and besides, the shatter resistance becomes inferior.

The solid component (C) directed to the process of the present invention is necessary to satisfy the following conditions besides the above conditions:

In the X-ray diffraction spector of the solid component (C), a new peak does not occur at a diffraction angle $2\theta=7°$ to 8°, as compared with the X-ray diffraction spector of the solid component (B), or even if it occurs, the intensity of the new peak is 2.0 times or less the intensity of the highest peak present at a $2\theta=8.5°$ to 9° of the X-ray diffraction spectrum of the solid component (C), preferably 1.5 times or less the above intensity, more preferably 1.0 time or less the above intensity.

When the above conditions are satisfied, the shatter resistance of the resulting solid component for olefin polymerization is more improved.

As the conditions of the above step of removing the alcohol part, for satisfying the above conditions of the X-ray diffraction spector, besides the above conditions, rapid removal of the alcohol is avoided, and also the removal is carried out preferably by heating at a relatively low temperature, under a reduced pressure, and over a relatively long time.

As to concrete conditions, the step of partly removing the alcohol is carried out using a vessel for example provided with a vibrating means for fluidizing the components (B) and (C), under a reduced pressure, at a heating temperature of 0° to 100° C., preferably 10° to 80° C., more preferably 20° to 60° C. and over 2 to 1,000 hours, preferably 3 to 500 hours.

In the process of the present invention, a halogen-containing titanium compound and an electron donor are contacted with the solid component (C) obtained according to the above process, in the presence of an aliphatic hydrocarbon solvent (S) having a boiling point of 90° to 180° C., at 110° to 135° C., to obtain a solid component (D).

As the halogen-containing titanium compound contacted with the solid component (C), the one expressed by the formula $Ti(OR^1)_{4-u}X_u$ is used, wherein $R^1$ represents an alkyl group, a cycloalkyl group or an aryl group; X represents a halogen; and u represents an optional number of $0 < u \leq 4$.

Concrete examples of the above compound are titanium tetrachloride, titanium tetrabromide, methoxytitanium trichloride, ethoxytitanium trichloride, propoxytitanium trichloride, butoxytitanium trichloride, phenoxytitanium trichloride, ethoxytitanium tribromide, butoxytitanium tribromide, diethoxytitanium dichloride, dibutoxytitanium dichloride, diethoxytitanium dibromide, dibutoxytitanium dibromide, triethoxytitanium chloride, etc. One or more kinds of these halogen-containing titaniums are used. Further, titanium tetrachloride is most preferred.

As the electron donor (E1) contacted with the solid component (C), organic compounds containing either one or more atoms of O, N, S or P are used. Among them, electron donors such as ethers, alcohols, esters, aldehydes, aliphatic acids, ketones, nitriles, amines, amides, isocyanates, phosphines, phosphites, phosphinites, acid anhydrides, Si-O-C bond-containing organosilicon, etc. are used. Among these, esters are preferably used.

Concrete examples are aliphatic monocarboxylic acid esters such as ethyl acetate, vinyl acetate, isobutyl acetate, octyl acetate, cyclohexyl acetate, etc., aromatic monocarboxylic acid esters such as methyl benzoate, ethyl benzoate, propyl benzoate, butyl benzoate, octyl benzoate, cyclohexyl benzoate, methyl toluylate, ethyl toluylate, amyl toluylate, ethyl ethylbenzoate, methyl anisate, ethyl anisate, etc., aliphatic polyvalent carboxylic acid esters such as diethyl succinate, dibutyl succinate, diethyl methylmalonate, diethyl ethylmalonate, diethyl butylmalonate, dibutyl maleate, dioctyl maleate, diethyl butylmaleate, diethyl itaconate, etc., aromatic polyvalent carboxylic acid esters such as monomethyl phthalate, dimethyl phthalate, diethyl phthalate, di-n-propyl phthalate, diisopropyl phthalate, di-n-butyl phthalate, diisobutyl phthalate, di-n-heptyl phthalate, di-2-ethyl-hexyl phthalate, di-n-octyl phthalate, diethyl isophthalate, diethyl terephthalate, dibutyl naphthalenedicarboxylate, etc. One or more kinds of these electron donors are used. Further, aromatic polyvalent carboxylic acid esters are most preferred.

When the above halogen-containing titanium compound and electron donor (E1) are contacted with the solid component (C), an aliphatic hydrocarbon solvent (S) having a boiling point of 90° to 180° C. is used.

The solvent having a boiling point of 90° to 180° C. refers to a solvent whose temperature at which the vapor pressure of the solvent is equal to the standard atmospheric pressure ($1.01325 \times 10^5$ Pa) is 90° to 180° C.

As such an aliphatic hydrocarbon solvent, saturated, unsaturated or halogenated ones are usable as far as their boiling points are 90° to 180° C.

Concrete examples thereof are n-paraffins such as n-heptane, n-octane, n-nonane, n-decane, etc., isoparaffins such as 2,2,3,3-tetramethylbutane, 2-ethylpentane, 2,2,3-trimethylpentane, 2,2,4-trimethylpentane, 2,3,4-trimethylpentane, 2-methylhexane, 3-methylhexane, 3-ethylhexane, 2,2-dimethylhexane, 2,3-dimethylhexane, 2,4-dimethylhexane, 2,5-dimethylhexane, 3,3-dimethylhexane, 3,4-dimethylhexane, 2-methylheptane, 3-methylheptane, 4-methylheptane, etc. or mixtures thereof are preferably used, and mixtures of isoparaffins are particularly preferable.

These mixtures of isoparaffins have been for example sold by Exone Chemical Corporation in the trade names of Isopar-C (b.p. temperature: 97° to 104° C.), Isopar-E (b.p. range: 116° to 142° C.) and Isopar G (b.p. range: 160° to 174° C.); thus, they are easily commercially available.

The used quantities of the solid component (C), halogen-containing titanium compound, electron donor and solvent (S) are as follows:

1 to 100 mols, preferably 3 to 50 mols of the halogen-containing titanium compound are used based upon one mol of $MgCl_2$ in the solid component (C). The electron donor (E1) is used in a quantity of 0.01 to 1.0 mol, preferably 0.01 to 0.8 mol based upon one mol of $MgCl_2$ in the solid component (C). Further, the solvent (S) is used in a quantity of 5 to 100 dm$^3$, preferably 5 to 70 dm$^3$, based upon 1 Kg of the solid component (C).

The order of the contact of the halogen-containing titanium compound and the electron donor (E1) with the solid component (C) has no particular limitation, but there is preferable a process of suspending the solid component (C) in the solvent (S), followed by contacting the halogen-containing titanium compound with the suspension and thereafter contacting the electron donor (E1).

The conditions under which the halogen-containing titanium compound and the electron donor (E1) are contacted with the solid component (C) are as follows:

The contact temperature is 110° to 135° C., preferably 115° to 135° C., and most preferably 120° to 135° C. Even if the contact temperature is too high or too low, the olefin polymerization activity of the resulting catalyst component for olefin polymerization lowers. The contact time is 5 minutes to 20 hours, preferably 10 minutes to 15 hours, most preferably 10 minutes to 10 hours.

In the above process, the solid product (D) obtained by contacting the halogen-containing compound and the electron donor (E1) with the solid component (C) is separated by filtration, decantation or the like, and successively contacted with a halogen-containing titanium compound.

As the halogen-containing titanium compound contacted with the solid component (D), there is used a halogen-containing titanium compound being the same one used to be contacted with the above-mentioned solid component (C), and expressed by the formula $Ti(OR^1)_{4-u}X_u$ (wherein $R^1$ represents an alkyl group, a cycloalkyl group or an aryl group, X represents a halogen and u represents an optional number of $0 < u \leq 4$. $TiCl_4$ is most preferably used as the compound.

When the above halogen-containing compound is contacted with the solid component (D), use of a solvent (S2) is more preferred in order to effectively achieve the object of the present invention.

As the solvent (S2), the same as those illustrated as the inert hydrocarbon solvent (S1) used if necessary, in the above spray step, or as those illustrated as the aliphatic hydrocarbon solvent (S) used when the solid component (D) is obtained, are usable, and aromatic hydrocarbons such as benzene, toluene, xylene, etc. are preferably used, and toluene is particularly preferably used. Use of the solvents, particularly aromatic hydrocarbons, is effective for more improving the olefin polymerization activity of the catalyst component for olefin polymerization.

The used quantities of the solid component (D), the halogen-containing titanium compound and the solvent (S2) are shown below. The halogen-containing titanium compound is used in a quantity of 1 to 100 mols, preferably 3 to 50 mols, based upon one mol of $MgCl_2$ in the solid component (D). Further, the solvent (S) is used in a quantity of 0 to 100 dm$^3$, preferably 5 to 70 dm$^3$, based upon 1 Kg of the solid component (D).

Conditions under which the halogen-containing titanium compound is contacted with the solid component (D) are as follows:

The contact temperature is 110° to 135° C., preferably 115° to 135° C., most preferably 120° to 135° C. The contact time is 5 minutes to 20 hours, preferably 10 minutes to 15 hours, most preferably 10 minutes to 10 hours.

After completion of contact of the halogen-containing compound with the solid component (D), the resulting solids are separated by filtration, decantation or the like, followed by washing the separated solids with an inert hydrocarbon solvent (S3) to remove unreacted substance, byproduct, etc., and thereby obtain the solid component (F) which is the final solid catalyst component for olefin polymerization.

As the inert hydrocarbon solvent (S3) used for the washing, the same inert hydrocarbon solvents as those illustrated as the above inert hydrocarbon solvent (S1) are usable.

The average particle diameter of the resulting solid component (F) is dependent upon that of the solid component (C), and although it decreases somewhat in the subsequent step, it is usually 90 to 100% of the average particle diameter of the solid component (C). The average particle diameter of the solid component (F) preferred to achieve the object of the present invention is 10 to 300 μm, and 15 to 200 μm are more preferable.

The solid component (F) obtained according to the above process of the present invention is combined with an organometallic compound catalyst component, preferably an organoaluminum compound (AL) and if necessary, an electron donor (E2), as in the case of known solid catalyst component for olefin polymerization, to make a catalyst and use it for olefin polymerization. More preferably, a small quantity of an olefin is reacted with the catalyst and the resulting catalyst is used as a preactivated catalyst for olefin polymerization.

As the organoaluminum compound (AL) as an organometallic compound catalyst component used for olefin polymerization, an organoaluminum compound expressed by the formula $AlR^2_p R^3_q X_{3-(p+q)}$ (wherein $R^2$ and $R^3$ each represent a hydrocarbon alkyl group such as alkyl group, cycloalkyl group, aryl group, etc. or an alkoxy group; X represents halogen; and p and q each represent an optical number of $0<p+q\leq 3$) is preferably used.

Concrete examples are trialkylaluminums such as trimethylaluminum, triethylaluminum, tri-n-propylaluminum, tri-n-butylaluminum, triisobutylaluminum, tri-n-hexyl-aluminum, triisohexylaluminum, tri-n-octylaluminum, etc., dialkylaluminum monohalides such as diethylaluminum chloride, di-n-propylaluminum chloride, diisobutylaluminum chloride, diethylaluminum bromide, diethylaluminum iodide, etc., dialkylaluminum hydrides such as diethylaluminum hydride, etc., alkylaluminum sesquihalides such as ethylaluminum sesquichloride, etc., and monoalkylaluminum dihalides such as ethylaluminum dichloride, etc., and besides, alkoxyalkylaluminums such as diethoxymonoethylaluminum, etc. can be also used.

Among these, trialkylaluminums and dialkylaluminum monohalides are preferably used, and trialkylaluminums are most preferable. Further, these organoaluminums can be used not only alone but also in admixture of two or more kinds.

As the electron donor (E2), known electron donors used, if necessary, for controlling the stereoregularity of olefin polymers obtained at the time of usual olefin polymerization, are used. Concretely, electron donors same as those mentioned above are used, and compounds having a Si-O-C bond are particularly preferable. Concrete examples are as follows:

methyltrimethoxysilane, methyltriethoxysilane, t-butyltrimethoxysilane, ethyltriethoxysilane, vinyltriethoxysilane, t-butyltriethoxysilane, phenyltrimethoxysilane, phenyltriethoxysilane, methylethyldimethoxysilane, dimethyldimethoxysilane, dimethyldiethoxysilane, diisopropyldimethoxysilane, diisobutyldimethoxysilane, di-t-butyldimethoxysilane, diphenyldimethoxysilane, trimethylmethoxysilane, trimethyltriethoxysilane, etc.

These electron donors can be used not only alone, but also in admixture of two or more kinds.

The quantities of the respective catalyst components used are the same as in the case where known catalyst components are used for olefin polymerization. Concretely, an organoaluminum compound (AL1) is used so that the quantity of Al atom in the organoaluminum compound (AL) may be 1 to 2,000 mols, preferably 5 to 1,000 mols, based upon one mol of Ti atom in the solid catalyst component obtained according to the process of the present invention; and an electron donor (E2) is used in a quantity of 0 to 10 mols, preferably 0.01 to 5 mols, based upon one mol of Al atom in the organoaluminum compound (AL).

Further, examples of olefins used for the preactivation are linear monoolefins such as ethylene, propylene, butene-1, pentene-1, hexene-1, heptene-1, octene-1, etc. and branched monoolefins such as 4-methylpentene-1, 2-methylpentene-1, etc.

These olefins may be the same as or different from those to be polymerized, and can be used in admixture of two or more kinds.

The manner of olefin polymerization wherein the catalyst having combined the solid catalyst component for olefin polymerization (F), the organometal compound catalyst component (AL) and if necessary, the electron donor (E2), or a catalyst obtained by preactivating the above catalyst by reacting a small quantity of olefin therewith, according to the process of the present invention, is used, is not limited. The above polymerization manner is suitable to suspension polymerization carried out in a solvent or bulk polymerization, but when the catalyst is used for gas phase polymerization, the merit of the solid catalyst component for olefin polymerization according to the process of the present invention is particularly exhibited. Further, in the olefin polymerization, the manner of using the preactivated catalyst is a preferable manner.

In the preactivation, it is preferred that 0.05 to 5,000 g, preferably 0.05 to 3,000 g of olefin based upon 1 g of the solid catalyst component F is reacted at 0° to 100° C. for one minute to 20 hours, to form olefin polymer of 0.01 to 2,000 g, preferably 0.05 to 500 g based upon 1 g of the solid catalyst component F.

The thus obtained catalyst or preactivated catalyst is used for olefin polymerization. The olefin polymerization conditions are as follows:

polymerization temperature: 20° to 150° C.;
polymerization pressure: 0.1 to 5 MPa; and
polymerization time: usually about 5 minutes to 20 hours.

In the polymerization, addition of an adequate quantity of hydrogen for molecular weight control, or the like, are the same as those in conventional polymerization process.

Examples of olefin used for polymerization are as follows:

linear monoolefins such as ethylene, propylene, butene-1, hexene-1, octene-1, etc.; branched monoolefins such as 3-methylbutene-1, 4-methylpentene-1, 2-methylpentene-1, etc.; and besides, diolefins such as butadiene, isoprene, chloroprene, 1,4-hexadiene, 1,7-octadiene, 1,9-decadiene, 4-methyl-1,4-hexadiene, 5-methyl-1,4-hexadiene, 7-methyl-1,6-octadiene, etc.; and allyltrimethylsilane, styrene, etc. Particularly, when an olefin of 3 or more carbon atoms which may contain silicon is polymerized, a highly stereo-specific olefin polymer is obtained.

Further, these olefins are not only subjected to single polymerization, but also to copolymerization by mutually combining each other olefins, for example, propylene with ethylene, butene-1 with ethylene, propylene with butene-1, or to copolymerization of combination of three components such as propylene, ethylene and butene-1, etc. Further, block copolymerization can also be carried out by varying the kinds of olefins fed in a multiple polymerization.

EXAMPLE

The present invention will be described in more detail by way of Examples.

In addition, the definitions of the terms employed in Examples and Comparative examples and the measurement methods therein are as follows:

(1) X-ray Diffraction Spectrum

X-ray diffraction apparatus JDX8200T made by Nippon Denshi Company, using Cu-Kα ray as X-ray source, was used, and measurement was carried out employing a tube voltage of 50 KV and a tube current of 150 mA.

(2) Particle Size Distribution in the Solid Component

Using the particle size distribution measuring apparatus according to Laser light diffraction method (Master sizer MS20) manufactured by Malburn instrument Company, the solid component was dispersed in a mineral oil, to measure the particle size distribution of the solid component.

(3) Average Particle Diameter

When a particle size diameter is measured according to the above item (2) and the volumes of the solid components of each particle size are integrated, the particle diameter obtained when the integrated volume occupies 50% of the whole, corresponds to the captioned average particle diameter. (Unit: $\mu$m).

(4) Span

When the integrated volume obtained in the same manner as in the above (3), occupies 90% of the whole, the particle diameter is referred to as $D_{0.9}$; when the integrated volume occupies 10% of the whole, the particle diameter is referred to as $D_{0.1}$; and when the average particle diameter of the above (3) is referred to as $D_{0.5}$, the span is defined by the following equation:

$$\text{Span} = (D_{0.9} - D_{0.1})/D_{0.5}.$$

The span is an index indicating the extent of the particle size distribution. Namely, the larger the span, the broader the particle size distribution, and the smaller the span, the narrower the particle size distribution.

(5) Polymerization Activity

This refers to the quantity (Kg) of polymerized olefin per 1 Kg of the solid catalyst component for olefin polymerization, and it corresponds to a scale of the olefin polymerization activity. (Unit: Kg·polymer/Kg·solid catalyst component).

(6) BD Refers to Bulk Density (Unit: Kg/m$^3$)

EXAMPLE 1

(1) Preparation of Solid Component (C)

Firstly, a solid component (B) was prepared using the apparatus shown in FIG. 1.

Into a nitrogen gas-purged, 60 dm$^3$ capacity, stainless melting vessel 4 were fed anhydrous MgCl$_2$ (8 Kg) through piping 1 and dry ethanol (15.5 Kg) through piping 2.

The resulting mixture (A) was heated with stirring up to 130° C. by passing heated steam into a jacket 5, to obtain a mixture (A) having a composition of MgCl$_2$·4.0EtOH, in a molten state, followed by further agitating for 2 hours, thereafter feeding nitrogen gas heated up to 130° C. into the melting vessel 4 through piping 3, to elevate the pressure of the gas phase part in the melting vessel 4 up to 0.5 MPa, successively spraying the resulting uniform, molten mixture (A) at a rate of 15 Kg/h via a two-fluids nozzle 8 via piping 7, into a cooled spray column 9, together with heated nitrogen gas at 130° C., introduced via piping 7.

n-Hexane (250 dm$^3$) cooled down to −15° C. has been previously introduced into the spray column 9, and in order to keep the temperature during the spraying, and to cool the inside of the spray column 9, a cooling medium at −30° C. was flown into a jacket 10 attached to the spray column 9.

The type of the nozzle 8 was a small type, precision two-fluids nozzle (BN-90, made by Seito Kyoritsu Shokai) and the flow quantity of the heated nitrogen gas introduced via piping 7 was 40 dm$^3$/min. The solid component (B) formed by cooling and solidification of the molten mixture (A), was collected into cooled n-hexane 11, introduced at the bottom part inside the spray column 9. The solid component (B) and n-hexane were withdrawn via piping 12 to the outside of the system, followed by separating n-hexane to obtain the solid component (B) (18.8 Kg). According to the analysis result of the resulting solid component (B), the composition of the solid component (B) was the same as that of the molten mixture (A), that is, MgCl$_2$·4.0EtOH. Further, the shape was spherical, the average particle diameter was 130 $\mu$m and the span was 1.5.

In order to partly remove ethanol contained in the resulting solid component (B) (18.8 Kg), the component was transferred into a 450 dm$^3$ capacity, vacuum dryer, followed by drying it under a reduced pressure of 267 Pa, for 20 hours at 35° C., further for 4 hours at 45° C. and successively for 24 hours at 50° C., to obtain a solid component (C) (11.5 Kg).

According to its analytical results, the composition of the component (C) was MgCl$_2$·1.7EtOH. From the solid component (C), smaller particles less than 65 $\mu$m and larger particles greater than 180 $\mu$m were removed by means of sieves, to obtain a solid component (C) (8.6 Kg) having an average particle diameter of 120 $\mu$m and a span of 0.9.

Figure 2:
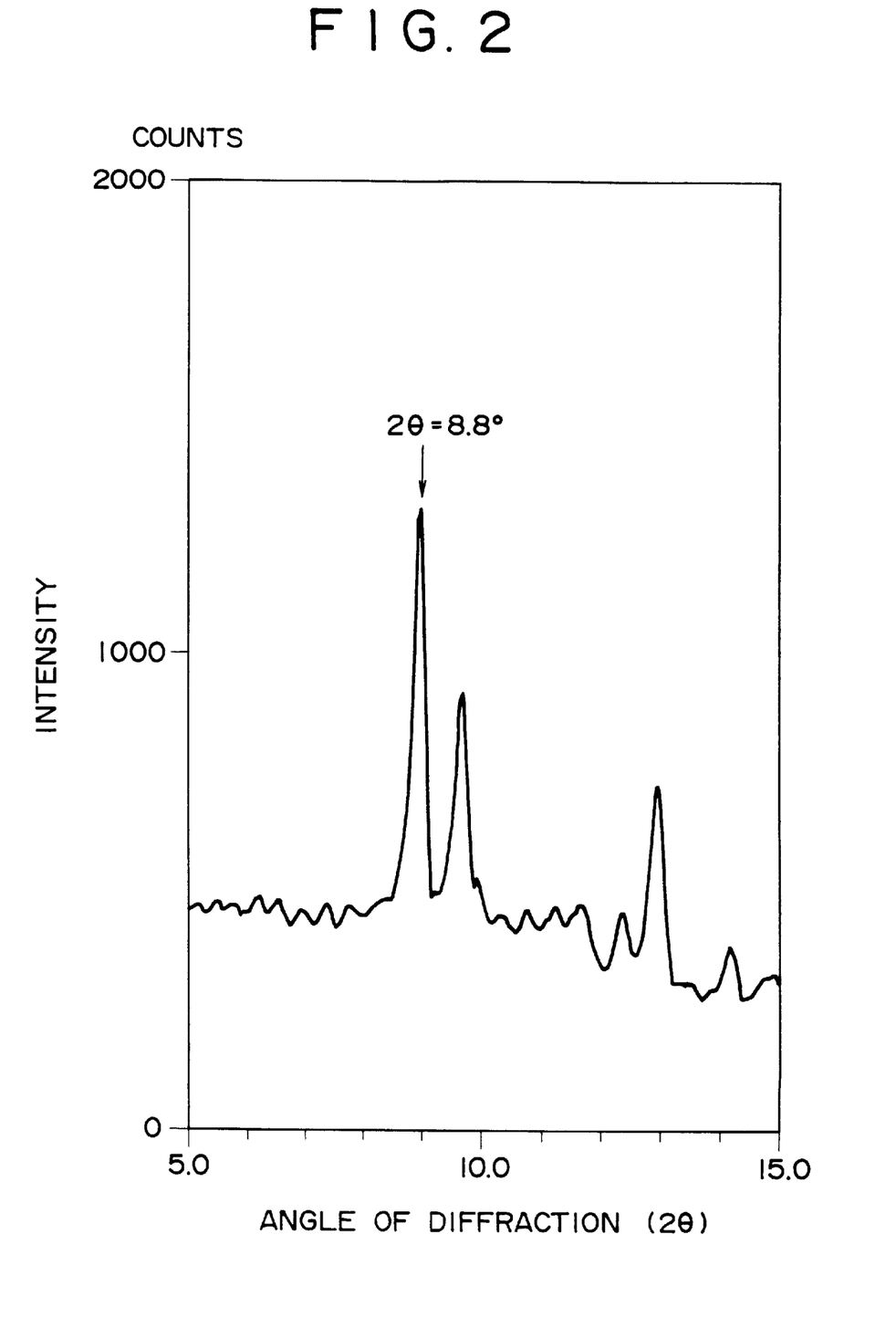
FIG. 2 shows the X-ray diffraction spectrum of solid component (B) obtained in Example 1.
Figure 3:
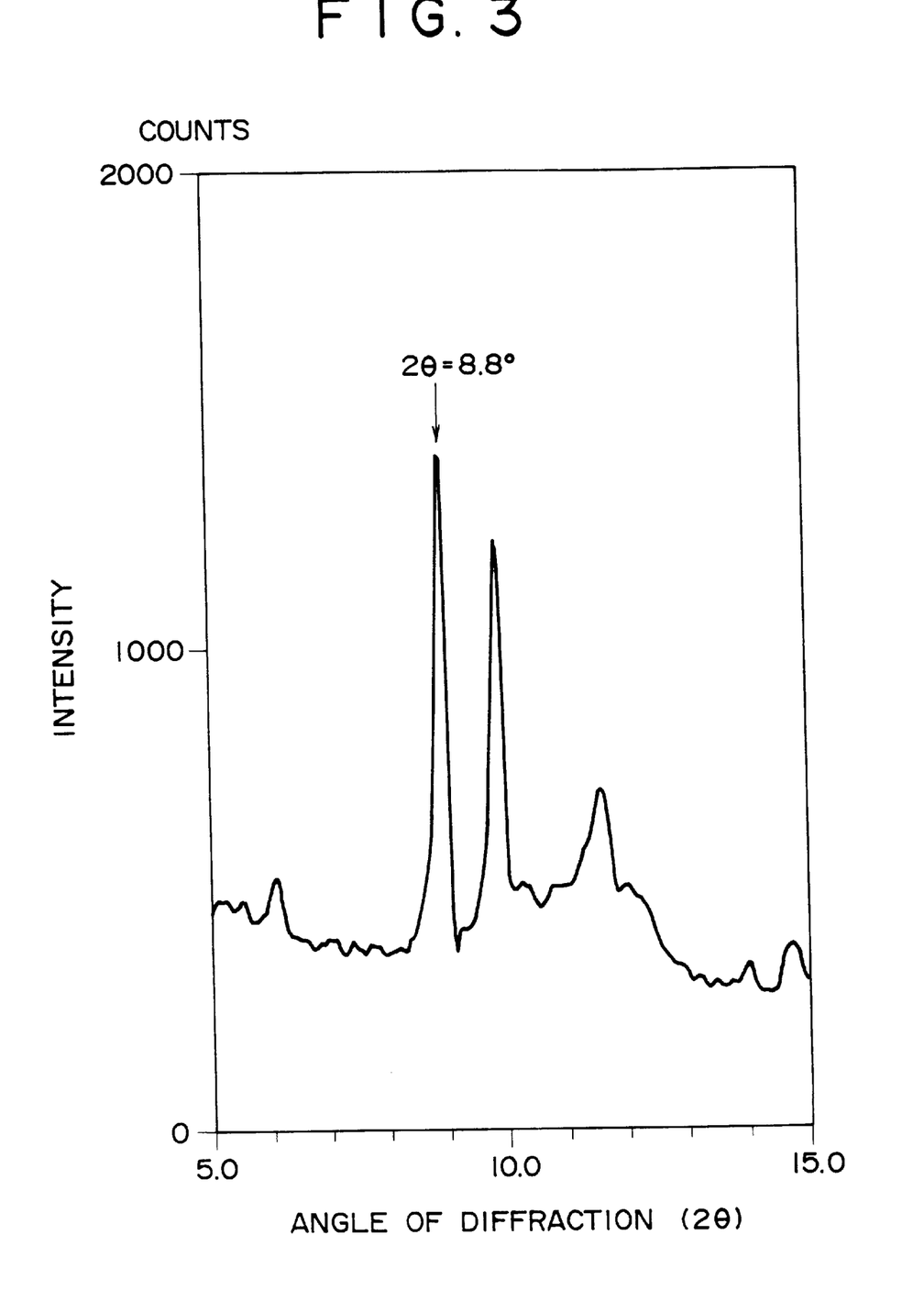
FIG. 3 shows the X-ray diffraction spectrum of solid component (C) obtained in Example 1.

The X-ray diffraction spectrum of the solid component (B) (MgCl$_2$·4.0EtOH) obtained by spray is shown in FIG. 2. Further, the X-ray diffraction spectrum of the solid component (C) (MgCl$_2$·1.7EtOH) having ethanol partly removed is shown in FIG. 3. A novel peak did not appear at a refraction angle of 2θ=7 to 8°.

(2) Preparation of a Solid Catalyst Component for Olefin Polymerization

Into a 110 dm$^3$ capacity stainless reactor provided with a condenser and a filtering means were fed the solid component (C) (8.6 Kg), Isopar E (a mixture of isoparaffins) made by Exone Chemical Corporation) (37 dm$^3$) and TiCl$_4$ (74 Kg) as a halogen-containing titanium compound. The mixture in the reactor was heated with stirring and when the temperature reached 100° C., diisobutyl phthalate (1.8 Kg) as an electron donor (E) was added, followed by raising the temperature inside the reactor up to 127° C., contact-treating at the same temperature for 1.5 hour, thereafter removing the liquid phase portion by filtration, adding toluene (37 dm$^3$) and TiCl$_4$ (74 Kg), heating the mixture at 120° C. for one hour, removing the liquid phase portion by filtration, adding toluene (70 dm$^3$), heating the mixture at 115° C. for 0.5 hour, removing the liquid phase portion, and three times washing with n-hexane (50 dm$^3$ each time), to obtain a solid component (F) (6.0 Kg) as a final solid catalyst component for olefin polymerization. This solid component (F) was spherical and had an average particle diameter of 115 $\mu$m and a span of 1.0. The Ti content in the solid component (F) was 2.0% by weight.

(3) Production of Olefin Polymer

Into a 20 dm$^3$ capacity, stainless reactor provided with a stirrer having slant blades, and purged with nitrogen gas, were added n-heptane (18 dm$^3$), triethyl-aluminum (150 mmol), diisopropyldimethoxysilane (22 mmol) and the solid component (F) obtained in the above (2) (180 g) at room temperature, followed by heating the mixture up to 40° C., and reacting under a propylene partial pressure of 0.03 MPa for 3 hours, to obtain a preactivated catalyst (propylene (3.0 g) per solid product (F) (1 g) was reacted).

Into a 110 dm$^3$ capacity, continuous, lateral type, gas phase polymerization vessel (length/diameter=3.7), provided with a stirrer and purged with nitrogen gas, was fed polypropylene powder (25 Kg) (average particle diameter:

1500 μm) having removed polymer particles of 500 μm or less, followed by further continuously feeding the above preactivated catalyst (F) in 0.73 g/h, and a 15% by weight n-hexane solution of triethylaluminum and diisopropyldimethoxysilane so as to afford a molar ratio of respectively 90 and 15 based upon Ti atom 1 mol in the solid component (F).

Further, into the polymerization vessel were fed hydrogen so as to afford a ratio of hydrogen concentration to propylene concentration of 0.02, and propylene so as to keep the pressure inside the polymerization vessel at 2.15 MPa, to carry out gas phase propylene polymerization continuously for 150 hours.

During the polymerization period, the polymer was withdrawn from the polymerization vessel at a rate of 11 Kg/h, so as to keep the level of the polymer contained in the polymerization vessel at 60% by volume.

The withdrawn polymer was successively contact-treated with nitrogen gas containing 5% by volume of water vapor, at 100° C. for 30 minutes, to obtain polypropylene particles.

Polypropylene particles obtained when 140 hours elapsed after initiation of the polymerization were spherical, and BD: 440 Kg/m$^3$, average particle diameter: 2200 μm and fine powder polymer less than 210 μm: 0.05% by weight.

Comparative Example 1

(1) Preparation of Solid Component (C)

This component was obtained in the same manner as in Example 1 (1).

(2) Preparation of Solid Catalyst Component for Olefin Polymerization

Example 1 (2) was repeated except that Isopar E was replaced by toluene, and the contact temperature with solid component (C), TiCl$_4$ and dibutyl phthalate was made 120° C., to obtain a solid catalyst component for olefin polymerization. This solid catalyst component had an average particle diameter of 115 μm and a span of 1.0.

(3) Production of Olefin Polymer

Example 1 (3) was repeated except that the solid component (F) was replaced by the final solid catalyst component obtained in the above (2), to obtain a preactivated catalyst.

Using this preactivated catalyst, propylene gas phase polymerization was carried out in the same manner as in Example 1 (3).

Comparative Example 2

(1) Preparation of Solid Component (C)

This component was obtained in the same manner as in Example 1 (1).

(2) Preparation of Solid Catalyst Component for Olefin Polymerization

Example 1 (2) was repeated except that Isopar E was replaced by n-hexane, and the contact temperature with solid component (C), TiCl$_4$ and diisobutyl phthalate was made 90° C., to obtain a solid catalyst component for olefin polymerization. It had an average particle diameter of 76 μm and a span of 1.5.

(3) Production of Olefin Polymer

Example 1 (3) was repeated except that the solid component (F) was replaced by the final solid catalyst component obtained in the above (2), to obtain a preactivated catalyst.

Using this preactivated catalyst, propylene gas phase polymerization was carried out in the same manner as in Example 1 (3).

Comparative Example 3

(1) Preparation of Solid Component (C)

This solid component (C) was obtained in the same manner as in Example 1 (1).

(2) Preparation of Solid Catalyst Component for Olefin Polymerization

Example 1 (2) was repeated except that Isopar E was replaced by Isopar G and the contact temperature of the solid component (C), TiCl$_4$ and diisobutyl phthalate was made 140° C., to obtain a solid catalyst component for olefin polymerization. This component had an average particle diameter of 114 μm and a span of 1.0.

(3) Production of Olefin Polymer

Example 1 (3) was repeated except that the solid component (F) was replaced by the final solid catalyst component obtained in the above (2), to obtain a preactivated catalyst. Using this preactivated catalyst, propylene gas phase polymerization was carried out in the same manner as in Example 1 (3).

Comparative Example 4

(1) Preparation of Solid Component (C)

Example 1 (1) was repeated to obtain a solid component (B) (18.8 Kg).

Next, Example 1 (1) was repeated except that conditions under which ethanol in the above solid component (B) (18.8 Kg) was partly removed, were carried out under a reduced pressure of 267 Pa, for 2 hours at 60° C., for 3 hours at 70° C. and for 3.5 hours at 80° C., to obtain a solid component (11.5 Kg). From this solid component, smaller particles less than 65 μm and larger particles more than 180 μm were removed by means of sieves, to obtain a solid component (6.9 Kg) having an average particle diameter of 115 μm and a span of 1.2. Successively, the procedure of obtaining the above solid component (B), the vacuum drying and sieving were separately repeated, to obtain a solid component (13.8 Kg).

Figure 4:
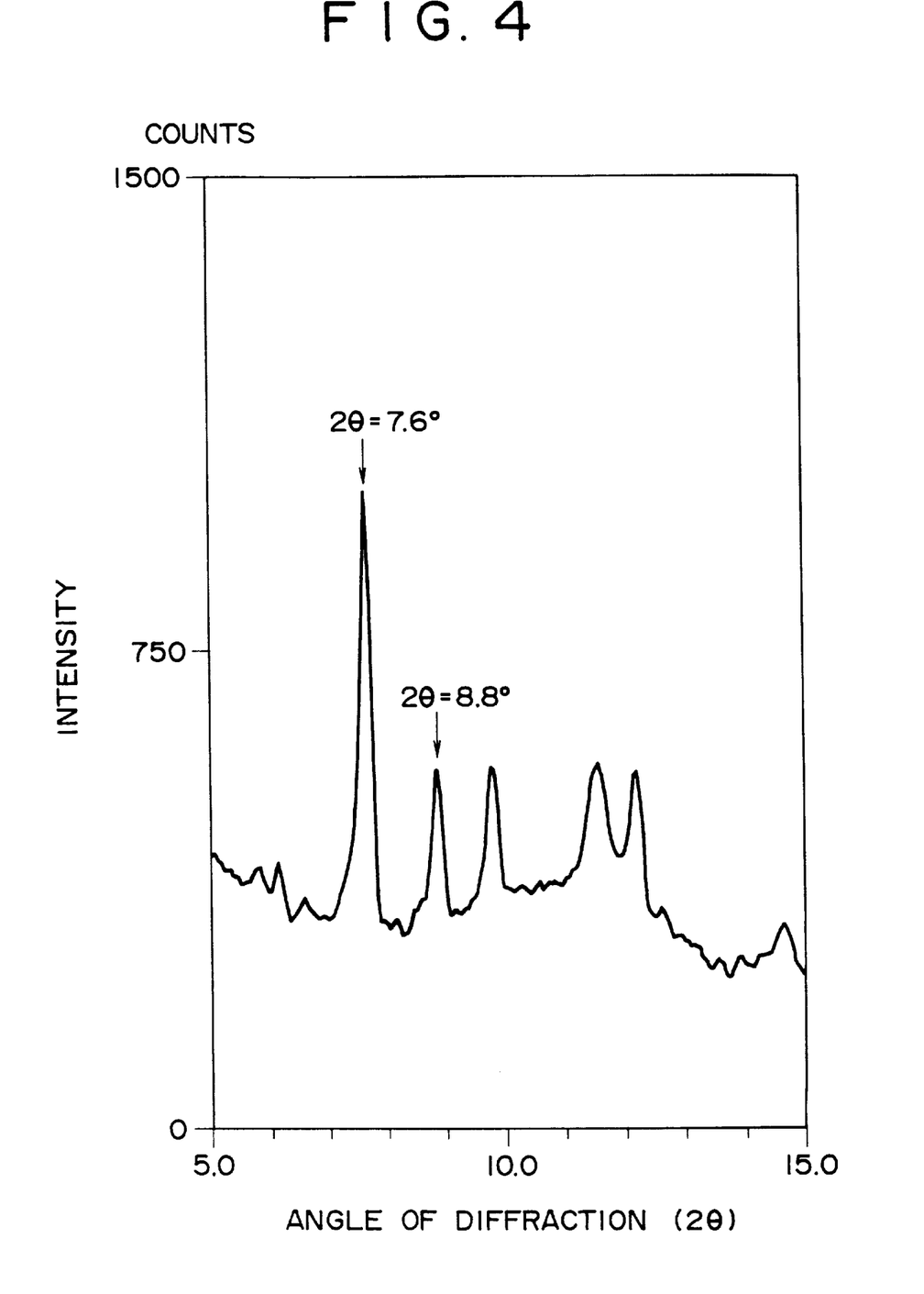
FIG. 4 shows the X-ray diffraction spectrum of solid component ($MgCl_2 \cdot 1.7EtOH$) obtained in Comparative example 4.
Figure 5:
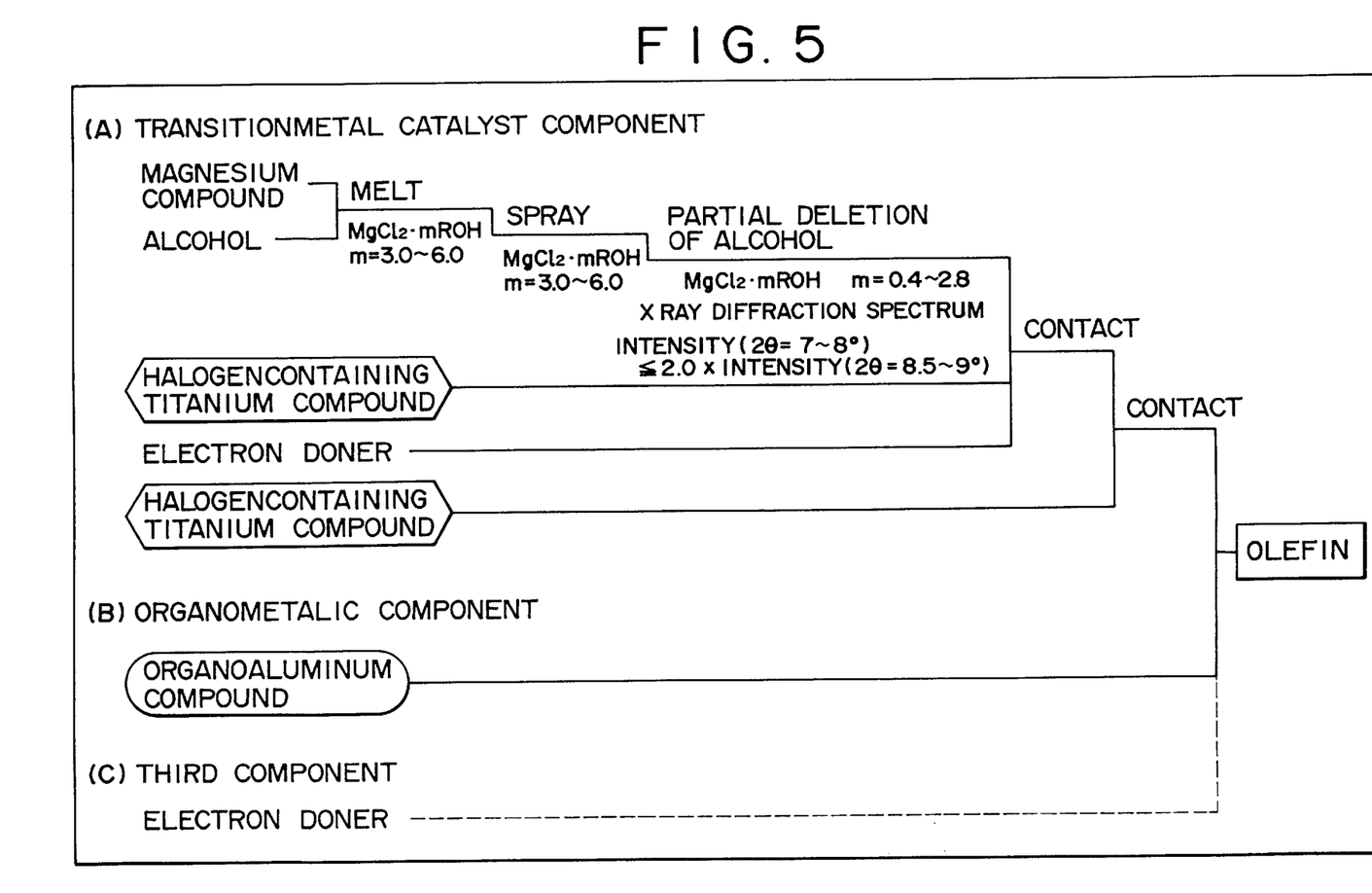
FIG. 5 shows a flow sheet of production of a solid catalyst component for olefin polymerization, for illustrating the process of the present invention.

The above solid component obtained by partly removing ethanol had a composition of MgCl$_2$•1.7EtOH. Further, X-ray diffraction spectrum of this solid component is shown in FIG. 4. A new peak appeared at a diffraction angle 2θ=7.6°, and the intensity of this new peak was 3.0 times the intensity of a diffraction angle 2θ=8.8°.

(2) Preparation of Solid Catalyst Component for Olefin Polymerization

Example 1 (2) was repeated except that the solid component (C) was replaced by the solid component (8.6 Kg) after sieved, obtained according to the above process, to obtain a final solid catalyst component (6.0 Kg). This component had an average particle diameter of 80 μm and a span of 1.5.

(3) Production of Olefin Polymer

Example 1 (3) was repeated except that the solid component (F) was replaced by the final solid catalyst component obtained in the above (2), to obtain a preactivated catalyst.

Using this preactivated catalyst, propylene gas phase polymerization was carried out in the same manner as in Example 1 (3).

The preparation conditions and polymerization results of the above Example 1 and Comparative Examples 1 to 4 are shown in Table 1.

TABLE 1

| Example and Comparative examples No. | | Example 1 | Comp. ex. 1 | Comp. ex. 2 | Comp. ex. 3 | Comp. ex. 4 |
|---|---|---|---|---|---|---|
| Component (B) | m value in composition formula $MgCl_2 \cdot mEtOH$ | 4.0 | 4.0 | 4.0 | 4.0 | 4.0 |
| Component (C) | n value in composition formula $MgCl_2 \cdot nEtOH$ | 1.7 | 1.7 | 1.7 | 1.7 | 1.7 |
| | X-ray diffraction spectrum relative intensity (Note 1) | 0 | 0 | 0 | 0 | 3.0 |
| (D) Preparation conditions | Solvent | Isopar E | toluene | n-hexane | Isopar G | Isopar E |
| | Contact temperature | 127 | 120 | 90 | 140 | 127 |
| Component (F) | Average particle diameter ($\mu$m) | 115 | 115 | 76 | 114 | 80 |
| | Particle diameter distribution span | 1.0 | 1.0 | 1.5 | 1.0 | 1.5 |
| Polymerization results | Polymerization activity (Kg.Polymer/Kg.catalyst) | 15100 | 15200 | 10400 | 10800 | 15600 |
| | BD ($Kg/m^3$) | 440 | 430 | 370 | 360 | 310 |
| | Average particle diameter ($\mu$m) | 2200 | 2100 | 1300 | 2000 | 1420 |
| | Quantity of fine powder polymer(Note 2) (weight%) | 0.05 | 0.85 | 3.52 | 0.50 | 1.75 |

Note 1: ratio of intensity of new peak of $2\theta = 7$ to $8°$, to intensity of maximum peak of $2\theta = 8.5$ to $9°$
Note 2: Quantity of fine powder polymer of particle diameter less than 210 $\mu$m, based upon the total polymer particles, measured by sieving.

Comparative Example 5

(1) and (2)

Example 1 (1) was repeated to obtain a solid component (B). Example 1 (2) was repeated except that the solid component (B) in place of the solid component (C) was not subjected to drying under reduced pressure, and from the component (B), smaller particles less than 65 $\mu$m and larger particles greater than 180 $\mu$m were removed by sieves, and among the resulting component (14.9 Kg) having an average particle diameter of 120 $\mu$m and a span of 1.0, 8.6 Kg thereof was used, to obtain a final solid catalyst component (4.1 Kg). The resulting final solid catalyst component has been broken and has an average particle diameter of 55 $\mu$m and a span of 1.8.

(3) Example 1, (3) was repeated except that the solid catalyst component (F) was replaced by the final solid catalyst component obtained according to the above step, to obtain preactivated catalyst.

Using the resulting preactivated catalyst, propylene gas phase polymerization was carried out in the same manner as in Example 1 (3).

Comparative Example 6

(1) Spray was carried out in the same manner as in Example (1) except that anhydrous $MgCl_2$ (8 Kg) and dry ethanol (6.6 Kg) were used to obtain a solid component (12.3 Kg). According to the analysis results of the solid component, its composition was $MgCl_2 \cdot 1.7EtOH$ same as that of a mixture of anhydrous Mg chloride with ethanol as raw material. Further, the solid component contained a large quantity of aggregate and an amorphous substance, and had an average particle diameter of 180 $\mu$m and a broad particle size distribution having an average particle diameter of 180 $\mu$m and a span of 2.1.

From the solid component (12.3 Kg) obtained by the above step were removed smaller particles less than 65 $\mu$m and larger particles greater than 180 $\mu$m by means of seives, without drying under reduced pressure, to obtain a solid component (4.9 Kg) having an average particle diameter of 119 $\mu$m and a span of 1.1. Successively, the above step and sieving were separately repeated in the same manner to obtain the solid product (9.8 Kg in total).

(2) Example 1 (2) was repeated except that the solid component (C) was replaced by the solid component (8.6 Kg) after sieved, obtained according to the process of the above (1), to obtain a final solid catalyst component (6.6 Kg). This component had an average particle diameter of 118 $\mu$m and a span of 1.1.

(3) Example 1 (3) was repeated except that the solid component (F) was replaced by the final solid catalyst component obtained in the above 2, to obtain a preactivated catalyst. Using this preactivated catalyst, propylene gas phase polymerization was carried out in the same manner as in Example 1 (3).

Comparative Example 7

(1) Spray was carried out in the same manner as in Example 1 (1) except that anhydrous $MgCl_2$ (8 Kg) and dry ethanol (25.2 Kg) were used, to obtain a solid component (26.5 Kg). According to the analytical results of this solid component, the component had a composition same as that of a mixture of anhydrous magnesium chloride with ethanol as the raw material ($MgCl_2 \cdot 6.5$ EtOH), an average particle diameter of 125 $\mu$m and a span of 1.4.

In order to partly remove ethanol in the solid component (26.5 Kg) obtained in the above (1), the component was transferred in a vacuum dryer, followed by continuously drying it at 35° C. for 22 hours, at 45° C. for 6 hours and at 53° C. for 20 hours under a reduced pressure of 267 Pa, to obtain solids (10.6 Kg). According to its analytical results, the solids had a composition of $MgCl_2 \cdot 1.7EtOH$.

Successively, from the solids were removed smaller particles less than 65 $\mu$m and larger particles greater than 180 $\mu$m by means of sieves, to obtain solids (8.9 g) having an average particle diameter of 120 $\mu$m and a span of 1.0.

(2) Example 1 (2) was repeated except that the solid component (C) was replaced by a portion (8.6 Kg) of 8.9 Kg of solids after sieved, obtained according to the above process of (1), to obtain a final solid catalyst component (6.1 Kg). This component had an average particle diameter of 96 μm and a span of 1.4, and during contact with $TiCl_2$ and diisobutyl phthalate, the component was broken.

(3) Example 1 (3) was repeated except that the solid component (F) was replaced by the final solid catalyst component obtained in the above (2), to obtain a preactivated catalyst. Using this preactivated catalyst, propylene gas phase polymerization was carried out.

Comparative Example 8

(1) Example 1 (1) was repeated, to obtain a solid component (B) (18.8 Kg). Example 1 (1) was repeated except that when the ethanol in the solid component (B) (18.8 Kg) was partly removed, this removal was continuously carried out under a reduced pressure of 267 Pa, at 35° C. for 20 hours, at 45° C. for 4 hours, and at 53° C. for 37 hours, to obtain a solid component (6.3 Kg). According to the analytical results, the composition of the solid component was $MgCl_2$•0.2 EtOH.

Further, from the solid component were removed smaller particles less than 65 μm and larger particles greater than 180 μm, to obtain a solid component (4.5 Kg) having an average particle diameter of 118 μm and a span of 1.1. Successively, the preparation of the solid component (B), and drying under reduced pressure and sieving were separately repeated in the same manner, to obtain a solid component (9.0 Kg in total).

(2) Example 1 (2) was repeated except that the solid component (C) was replaced by the solid component (8.6 Kg) after sieved, obtained according to the above process of the above (1), to obtain a final solid component (8.4 Kg). This component had an average particle diameter of 118 μm and a span of 1.1.

(3) Example 1 (3) was repeated except that the solid component (F) was replaced by the final solid catalyst component obtained in the above (2), to obtain a preactivated catalyst. Using this preactivated catalyst, propylene gas phase polymerization was carried out in the same manner as in Example 1 (3).

Comparative Example 9

(1) Example 1 (1) was repeated except that spray was carried out using anhydrous $MgCl_2$ (10 Kg) and dry ethanol (7.3 Kg), to obtain a solid component (13.7 Kg). According to the analytical results of the solid component, the composition of the solid component was $MgCl_2$•1.5EtOH same as that of the mixture of magnesium chloride with ethanol prior to spray. The resulting solid component had an average particle diameter of 190 μm and a span of 2.3 and contained a large quantity of aggregate and amorphous substance.

In order to partly remove ethanol contained in the solid component (13.7 Kg) obtained in the above step, the component was transferred into a vacuum dryer, followed by drying it at 55° C., for 7 hours and under a reduced pressure of 267 Pa, to obtain solids (11.2 Kg). From the analytical results, the composition of the solids was $MgCl_2$•1.0EtOH. Further, from the resulting solids were removed smaller particles less than 65 μm and larger particles greater than 180 μm, by means of sieves, to obtain solids (4.5 Kg) having an average particle diameter of 122 μm and a span of 1.2. Successively, the preparation, vacuum drying and sieving of the above solid component were separately repeated in the same manner, to obtain solids (9.0 Kg in total).

(2) Example 1 (2) was repeated except that the solid component (C) was replaced by the solids (8.6 Kg) after sieved, obtained according to the process of the above (1), to obtain a final solid catalyst component (8.4 Kg). This component had an average particle diameter of 120 μm and a span of 1.1.

(3) Example 1 (3) was repeated except that the solid component (F) was replaced by the final solid catalyst component obtained in the above (2), to obtain a preactivated catalyst. Using this preactivated catalyst, propylene gas phase polymerization was carried out in the same manner as in Example 1 (3).

EXAMPLE 2

(1) Preparation of Solid Component (C)

Spray was carried out in the same manner as in Example 1 (1) except that anhydrous $MgCl_2$ (8 Kg) and dry ethanol (19.4 Kg) were used and the flow quantity of heated nitrogen gas led via piping 7 into a two fluids nozzle 8 was made 50 dm³/min., to obtain a solid component (B) (21.9 Kg). According to the analytical results of this solid component (B), the composition of this solid component was $MgCl_2$•5.0EtOH same as that of the mixture (A) of magnesium chloride with ethanol prior to spray. The resulting solid component (B) had an average particle diameter of 100 μm and a span of 1.3.

In order to partly remove ethanol contained in the solid component (B) (21.9 Kg) obtained by the above step, the component was transferred into a vacuum dryer, followed by drying it under a reduced pressure of 267 Pa, at 40° C. for 15 hours, further at 50° C. for 3 hours and successively at 56° C. for 18 hours, to obtain a solid component (C) (11.0 Kg). From the analytical results, the composition of this solid component was $MgCl_2$•1.5EtOH. From this solid component (C), were removed smaller particles less than 45 μm and larger particles greater than 150 μm, by means of sieves, to obtain a solid component (C) (8.7 Kg) having an average particle diameter of 91 μm and a span of 1.0.

The above solid component (C) ($MgCl_2$•1.5EtOH) obtained by partly removing ethanol was subjected to X-ray diffraction analysis. A new peak appeared at a diffraction angle 2θ=7.6°, but its intensity was 1.5 times the peak of diffraction angle 2θ=8.8°.

(2) Preparation of Solid Catalyst Component for Olefin Polymerization

Example 1 (2) was repeated except that the solid component (C) was replaced by the solid component (C) (8.6 Kg) after sieved, obtained according to the above process (1), to obtain a solid component (F) (5.9 Kg) as a final solid catalyst component for olefin polymerization. This solid component (F) had an average particle diameter of 88 μm and a span of 1.0.

(3) Olefin Polymerization

Example 1 (3) was repeated except that the solid component (F) was replaced by the solid component (F) obtained in the above (2), to obtain a preactivated catalyst.

Using this preactivated catalyst, propylene gas phase polymerization was carried out in the same manner as in Example 1 (3).

EXAMPLE 3

(1) Preparation of Solid Component (C)

Spray was carried out in the same manner as in Example 1(1) except that anhydrous $MgCl_2$ (8 Kg) and dry ethanol (17.4 Kg) were used, to obtain solid component (B) (20.5 Kg). From the analytical results of this solid component (B), the composition of this solid component was MgCl$_2$•4.5EtOH same as that of a mixture (A) of MgCl$_2$ with ethanol prior to spray. The resulting solid component (B) had an average particle diameter of 130 μm and a span of 1.5.

In order to partly remove ethanol contained in the solid component (B) (20.5 Kg) obtained in the above step, the solid component was transferred into a vacuum dryer, followed by drying it under a reduced pressure of 267 Pa, at 35° C. for 19 hours, further at 45° C. for 4 hours, and successively at 50° C. for 24 hours, to obtain a solid component(C) (13.5 Kg). From the analytical results, the composition of this solid component (C) was MgCl$_2$•2.1EtOH. From this solid component (C) were removed smaller particles less than 65 μm and larger particles greater than 180 μm by means of sieves, to obtain a solid component (C) (10.2 Kg) having an average particle diameter of 120 μm and a span of 1.0.

The X-ray diffraction analysis of the solid component (C) (MgCl$_2$•2.1EtOH) was carried out. A new peak did not appear at a diffraction angle 2θ=7 to 8°.

(2) Preparation of a Solid Catalyst Component for Olefin Polymerization

Example 1 (2) was repeated except that the solid component (C) (8.6 Kg) after sieved, obtained at the above (1) was used; Isopar E was replaced by n-heptane as solvent; diisobutyl phthalate was replaced by di-n-butyl phthalate (1.8 Kg) as an electron donor; and the contact temperature of the solid component (C) with TiCl$_4$ and di-n-buLtyl phthalate was made 120° C., to obtain a solid component (F) (5.5 Kg) as the final solid catalyst component for olefin polymerization. The solid component (F) had an average particle diameter of 118 μm and a span of 1.0.

(3) Production of Olefin Polymer

Example 1 (3) was repeated except that the solid component (F) obtained in the above (2) was used as the solid component (F), to obtain a preactivated catalyst.

Using the resulting preactivated catalyst, propylene gas phase polymerization was carried out in the same manner as in Example 1 (3).

The preparation conditions of Comparative examples 5 to 9 and Examples 2 and 3 and the polymerization results are shown in Table 2.

TABLE 2

| Nos. of Examples and Comparative examples | | Comp. ex. 5 | Comp. ex. 6 | Comp. ex. 7 | Comp. ex. 8 | Comp. ex. 9 | Example 2 | Example 3 |
|---|---|---|---|---|---|---|---|---|
| Component (B) | m value in composition formula MgCl$_2$.mEtOH | 4.0 | 1.7 | 6.5 | 4.0 | 1.5 | 5.0 | 4.5 |
| Component (C) | n value in composition formula MgCl$_2$.nEtOH | 4.0 | 1.7 | 1.7 | 0.2 | 1.0 | 1.5 | 2.1 |
| | X-ray diffraction spectrumrelative intensity (Note 1) | Not measured | Not measured | Not measured | Not measured | Not measured | 1.5 | 0 |
| (D) Preparation conditions | Solvent | Isopar E | Isopar E | Isopar E | Isopar E | Isopar E | Isopar | n-heptane |
| | Contact temperature | 127 | 120 | 90 | 140 | 127 | 127 | 120 |
| Component (E) | Average particle diameter (μm) | 55 | 118 | 96 | 118 | 120 | 88 | 118 |
| | Particle diameter distribution span | 1.8 | 1.1 | 1.4 | 1.1 | 1.1 | 1.0 | 1.0 |
| Polymerization results | Polymerization activity (Kg.Polymer/Kq.catalyst) | | | | | | 15500 | 15900 |
| | BD (Kg/m$^3$) | | | | | | 440 | 430 |
| | Average particle diameter (μm) | | | | | | 2210 | 2230 |
| | Amount of fine powder polymer (Note 2) (weight %) | | | | | | 0.08 | 0.07 |

Note 1: Ratio of intensity of new peak at 2θ = 7 to 8°, to maximum intensity at 2θ =8.5 to 9°
Note 2: Quantity of fine powder polymer having a particle diameter less than 210 μm, to the total polymer particles, measured by sieving.

Effectiveness of the Invention

The main effectiveness of the present invention consists in that when the solid catalyst component for olefin polymerization, obtained according to the process of the present invention, an organoaluminum compound and if necessary, an electron donor, is used for olefin polymerization, it is possible to stably produce a highly stereoregular olefin polymer with a notably high polymerization activity over a long period without causing any operational problem.

As apparent from the above Examples 1 to 3, the solid catalyst component, obtained according to the process of the present invention, is superior in the shatter resistance and the narrowness of the particle size distribution. Particularly when the catalyst component is used for gas phase polymerization, it is possible to obtain polymer particles having a relatively large particle diameter and a high bulk density, with very few occurrence of fine powder polymer and with a high polymerization activity.

Whereas, if a solid catalyst component obtained according to a process other than the process of the present invention is applied to olefin polymerization, operational problems such as occurrence of fine powder polymer, low polymerization activity, etc. are raised; hence it is impossible to stably produce a highly stereo-regular olefin polymer (see Comparative examples 1 to 9).

What is claimed is:

1. An improved process for producing a solid catalyst for olefin gas phase polymerization, said process comprising the steps of:

spraying a mixture (A) of anhydrous magnesium chloride with ethanol, which mixture (A) is represented by the formula $MgCl_2 \cdot mEtOH$ and m=4.0 to 5.0, in a molten state, wherein said molten state is obtained by heating mixture (A) to a temperature between 110° C. to 160° C., into a spray column, the inside of said spray column being cooled down to a temperature of −40° C. to −5° C., without any substantial vaporization of the alcohol in the mixture (A), to obtain the solid component (B) such that solid component (B) has the same formula as mixture (A) and solid component (B) has a spherical shape, an average particle diameter of 100 μm to 130 μm and a span of 1.3 to 1.5;

partly removing the ethanol from the solid component (B) at 35° C. to 56° C. under reduced pressure, to obtain a solid component (C), wherein solid component (C) is represented by the formula $MgCl_2 \cdot nEtOH$ and n=1.5 to 2.1 and wherein solid component (C) has an average particle diameter of 91 μm to 120 μm and a span of 0.9 to 1.0 after sieving; wherein 3–50 mols halogen containing titanium compound and 0.01–0.8 mol electron donor are respectively used per 1 mol of $MgCl_2$ contained in the solid component (C); and wherein in the X-ray diffraction spectrum of the solid component (C), a novel peak does not occur at a diffraction angle 2θ=7 to 8° as compared with the X-ray diffraction spectrum of the solid component (B), or even if it occurs, the intensity of the novel peak is 2.0 times or less the intensity of the highest peak present in the diffraction angle 2θ=8.5 to 9° of the X-ray diffraction spector of the solid component (C);

contacting a halogen-containing titanium compound selected from the group consisting of titanium tetrachloride and titanium tetrabromide, with an electron donor (E1) comprising an organic compound containing one or more atoms of O, N, S or F with the solid component (C), to obtain a solid component (D), wherein the halogen-containing titanium compound and the electron donor are contacted with the solid component (C) for 10 minutes to 10 hours at 120° to 135° C. using an aliphatic hydrocarbon solvent comprising an isoparaffin (S) having a boiling point of 90° to 180° C.; and, contacting the halogen-containing titanium compound with the solid component (D), to obtain a solid catalyst component for olefin polymerization (F) wherein solid component (F) has an average particle diameter of 88 μm to 118 μm and a span of 1.0.

* * * * *